United States Patent
Klosinski et al.

(10) Patent No.: US 9,890,709 B2
(45) Date of Patent: Feb. 13, 2018

(54) METHOD AND SYSTEM FOR GAS TURBINE EXTRACTION

(71) Applicant: General Electric Company, Schenectady, NY (US)

(72) Inventors: Joseph Philip Klosinski, Atlanta, GA (US); Michael Anthony Cocca, Atlanta, GA (US); Alston Ilford Scipio, Atlanta, GA (US); Patrick C. Bowling, Atlanta, GA (US); Sanji Ekanayake, Atlanta, GA (US)

(73) Assignee: General Electric Company, Schenectady, NY (US)

(*) Notice: Subject to any disclaimer, the term of this patent is extended or adjusted under 35 U.S.C. 154(b) by 200 days.

(21) Appl. No.: 14/531,692

(22) Filed: Nov. 3, 2014

(65) Prior Publication Data

US 2016/0123190 A1    May 5, 2016

(51) Int. Cl.
*F02C 1/00* (2006.01)
*F02C 6/04* (2006.01)

(52) U.S. Cl.
CPC .............. *F02C 6/04* (2013.01); *Y02E 20/14* (2013.01)

(58) Field of Classification Search
CPC ...... F02C 9/18; F02C 6/04; F01K 7/38; F01K 7/16; F01K 23/10
See application file for complete search history.

(56) References Cited

U.S. PATENT DOCUMENTS

| | | | | |
|---|---|---|---|---|
| 3,255,586 | A * | 6/1966 | Hennig | F02C 9/52 60/39.17 |
| 3,974,644 | A | 8/1976 | Martz et al. | |
| 4,201,924 | A | 5/1980 | Uram | |
| 6,363,711 | B2 | 4/2002 | Schmid et al. | |
| 6,442,924 | B1 | 9/2002 | Talley et al. | |
| 6,442,941 | B1 | 9/2002 | Anand et al. | |
| 6,543,234 | B2 | 4/2003 | Anand et al. | |
| 6,745,569 | B2 * | 6/2004 | Gerdes | F02C 6/16 60/39.183 |
| 7,284,377 | B2 * | 10/2007 | Joshi | F02C 3/305 60/39.55 |
| 8,209,951 | B2 | 7/2012 | Hibshman, II | |
| 9,003,764 | B2 * | 4/2015 | Thacker | F02C 6/00 122/7 B |
| 2002/0129608 | A1 | 9/2002 | Anand et al. | |
| 2003/0131599 | A1 * | 7/2003 | Gerdes | F02C 6/16 60/727 |

(Continued)

FOREIGN PATENT DOCUMENTS

EP    1 164 254 A2    12/2001
EP    1 186 761 A2    3/2002

*Primary Examiner* — Pascal M Bui Pho
*Assistant Examiner* — Edwin Kang
(74) *Attorney, Agent, or Firm* — Nixon & Vanderhye P.C.

(57) ABSTRACT

A method and system to extract gas from a gas turbine having at least one gas extraction mechanism placed at the turbine section that extracts exhaust gas directly from the turbine stages through the turbine casing, providing a first exhaust gas path that extends from the turbine section through the exhaust section to the exhaust gas outlet, and a second exhaust gas path for extracted exhaust gas extending directly from the turbine stages inside the turbine casing to a duct outside of the turbine casing. The gas extraction system and method can be applied to a cogeneration system.

14 Claims, 4 Drawing Sheets

(56) References Cited

U.S. PATENT DOCUMENTS

| | | | |
|---|---|---|---|
| 2005/0262848 A1* | 12/2005 | Joshi | F02C 3/305 60/772 |
| 2011/0154804 A1 | 6/2011 | Sutterfield | |
| 2013/0318965 A1 | 12/2013 | Ekanayake et al. | |

* cited by examiner

METHOD AND SYSTEM FOR GAS TURBINE EXTRACTION

The present invention relates to a method and system to extract gas from the turbine section of a gas turbine, particularly for managing power generation by gas turbines.

BACKGROUND OF THE INVENTION

The turbine section of a gas turbine houses stages of turbine wheels, and is typically sealed such that all of the hot exhaust gas produced by the gas turbine passes through the turbine sections to generate power, and preferably all of the hot exhaust gas exits the gas turbine through an exhaust section. A gas turbine can be used in a cogeneration system by being coupled to a heat recovery generator that uses heat from the hot exhaust gas to produce steam.

Typically, the steam generated through the cogeneration operation is proportional to the power generation by the gas turbine. The exhaust gas produced by the gas turbine would be the sole contributor of heat in the heat recovery steam generator to produce steam. The quantity of hot exhaust gas produced by the turbine typically determines the amount of steam produced by recovering heat from the hot exhaust.

Occasions may arise when the demand for steam is greater than the demand for the amount of steam conventionally generated from the hot exhaust of the gas turbine. For example, during the winter time, it may be desirable to produce and provide more steam than power to the users. Conventionally, to produce an increase in steam, an increase of gas turbine exhaust production would be needed, and an increase in power from the gas turbine would also be generated proportionally. The extra power generated from the gas turbine may not be needed. Furthermore, more fuel to the gas turbine would be needed to produce more power and steam in the process. Thus, the cost of fuel and cost of operation may increase while producing a product that may not be desired in the output.

BRIEF DESCRIPTION OF THE INVENTION

Contrary to the conventional objective of sealing a turbine section, the present invention provides a gas extraction system capable of extracting hot exhaust gas directly from the turbine section of a gas turbine. The extracted exhaust gas can be applied to, for example, a heat recovery generator to produce an increase in steam without producing a proportional amount of power from a gas turbine.

An embodiment turbine extraction system includes a gas turbine having at least one turbine stage in a turbine section that is encased by a turbine casing, and an exhaust section operatively connected to the turbine section and an exhaust outlet; at least one gas extraction mechanism placed at the turbine section that extracts exhaust gas from the turbine stages through the turbine casing to produce extracted exhaust gas; a first exhaust gas path defined by the turbine casing, extending from the turbine section through the exhaust section to the exhaust gas outlet to exit the gas turbine; and a second exhaust gas path for the extracted exhaust gas that extends from the turbine stages by the gas extraction mechanism to exit the gas turbine. The exhaust gas is transported to a working fluid device that applies energy from the extracted exhaust gas to produce work.

An embodiment of the present invention includes a cogeneration system having a gas turbine and a heat recovery steam generator downstream of the gas turbine. The gas turbine includes at least one turbine stage in a turbine section that is encased by a turbine casing, and an exhaust section operatively connected to the turbine section and an exhaust gas outlet; at least one gas extraction mechanism placed at the turbine section that extracts exhaust gas through the turbine casing; a first exhaust gas path defined by the turbine casing, from the turbine section extending through the exhaust section and the exhaust gas outlet; and a second exhaust gas path for extracted exhaust gas that extends from the turbine stages, through the turbine casing and the gas extraction mechanism. The first exhaust gas path and the second exhaust gas path may converge downstream of the gas turbine and upstream of the steam generator in applications where the steam generator is the only device capable of receiving the hot gas A method using the present embodiments to extract exhaust gas from turbine stages includes operating a gas turbine that is connected to a heat recovery steam generator in a cogeneration system; determining the quantity of desired steam production and the quantity of desired power production from the cogeneration system; receiving, using a central controller, temperature reading of exhaust gas from the gas turbine that is transported to the heat recovery steam generator, and flow reading of steam generated by the heat recovery steam generator; calculating, using the central controller, a desired exhaust gas temperature of exhaust gas to be sent to the heat recovery steam generator; sending, using a central controller, control signals to at least one valve that is connected to a gas extraction mechanism on a turbine section of the gas turbine; extracting exhaust gas directly from the turbine section, through the turbine casing, using the gas extraction mechanism; mixing the extracted exhaust gas with exhaust gas obtained from an exhaust gas outlet of the gas turbine; transporting mixed exhaust gas to the heat recovery steam generator; and producing steam using the mixed exhaust gas.

DETAILED DESCRIPTION OF THE INVENTION

In a conventional co-generation power plant, fuel and air are supplied to a gas turbine. Air passes through an inlet of the gas turbine into the compressor section upstream of combustors in the gas turbine. After the air is heated by combustors, the heated air and other gases produced in the process (i.e., combustion gas) pass through the turbine section. The full volume of exhaust gas from the gas turbine passes from the turbine section to an exhaust section of the gas turbine, and flows to a heat recovery steam generator (HRSG) that extracts heat from the exhaust gas to produces steam.

If the demand for steam is lower than the amount of steam that could be generated by the gas turbine exhaust, some of the exhaust gas could be directed away from the heat recovery steam generator, such as being transported to an exhaust stack that filters the exhaust gas prior to being released into the atmosphere. Alternatively, if steam production is in higher demand than the steam generated by the gas turbine exhaust, then an increase in exhaust gas from the gas turbine could be produced to generate the steam desired.

The present embodiments provide a method and system to extract hot exhaust gas directly from the turbine section. The gas extraction method and system can be used in a cogeneration system such that the cogeneration system can produce a higher quantity of steam without needing to produce a proportional increase of power. The embodiment system thus provides an efficient use of the fuel input into the cogeneration system, and avoids wasteful production of undesired power by the gas turbine.

Advantages include the ability to modulate steam production at a desired level while maintaining thermal and other operating efficiencies; the ability to provide a higher temperature gases to produce more steam downstream of the gas turbine; the ability to operate at a lower power output on the gas turbine and generate more steam; the ability to minimize wasteful products (i.e., producing unnecessary power in the gas turbine); and the ability to operate a cogeneration system at a more cost effective and efficient capacity.

Figure 1:
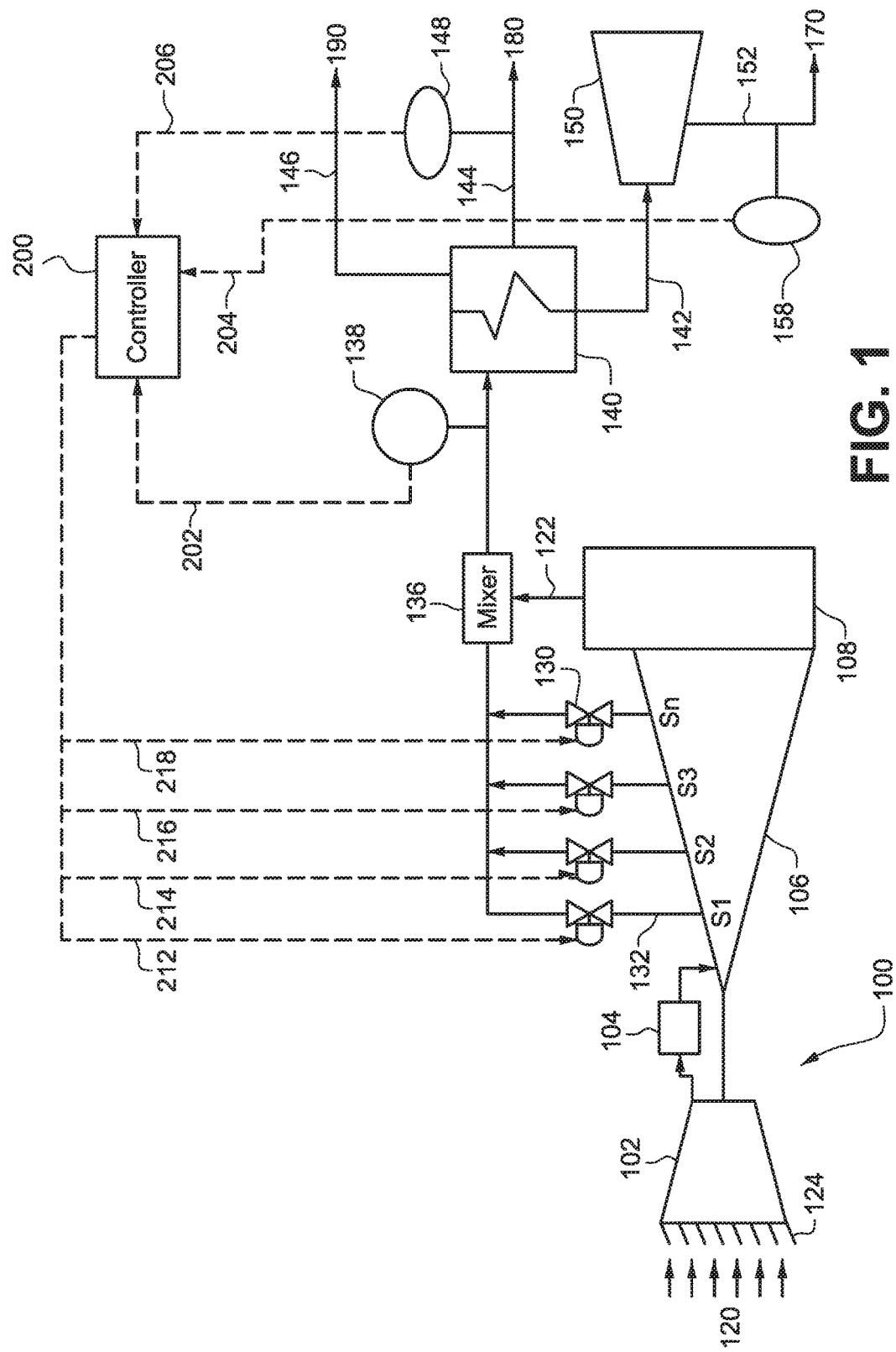
FIG. 1 is a schematic drawing of an embodiment cogeneration system.

The embodiment co-generation system depicted in FIG. 1 has the capability to extract exhaust gas from turbine stages directly through a turbine casing of the turbine section prior to passing through the exhaust section and the exhaust gas outlet of the gas turbine.

Air or other gases may enter the gas turbine 100 through an air inlet 120, such as through inlet guide vanes 124. Air is compressed in the compressor section 102, heated and mixed with fuel in the combustor section 104, and combustor gases flow from the combustor section 104 to the turbine section 106. The turbine section 106 includes stage of turbines, such as S1, S2, S3, to Sn. Downstream of the turbine section 106, hot exhaust gases pass through an exhaust section 108 of the gas turbine and pass through an exhaust gas outlet 122.

In an embodiment, a turbine section may have two stages, for example, a low pressure section and a high pressure section. In another embodiment, the gas turbine may be a two-shaft turbine that includes a low pressure section and a high pressure section. The gas turbine may also have 4 or more stages in the turbine section that may be applicable to a cogeneration system to produce power and heated gases to be used in a heat recovery steam generator downstream of the gas turbine.

The turbine section 106 includes a turbine casing that encases rotating turbines inside the turbine section 106, which mechanically drives the compressors in the compressor section 102. The turbine casing is normally sealed with only two openings: a gas inlet at the upstream of the turbine section 106, and an outlet at the downstream of the turbine section 106 that connects to the exhaust section 108. Conventionally, the entire volume of exhaust gas passes through the turbine section 106 and the exhaust section 108 to the exhaust gas outlet 122, and the exhaust gas is directed to the heat recovery steam generator 140.

If it is determined that the demand for steam production is higher than the produced power by the gas turbine, exhaust gas may be extracted from the turbine stages directly through the turbine casing to obtain gases at higher temperatures than the gases obtained at from the outlet of the exhaust section 108. The heated gas that passes through the turbine stages, S1, S2, S3, to Sn, may be extracted at any one or more of the turbine stages.

Temperature of the exhaust gas in the turbine stages is higher in the earlier stages (i.e., turbine stages closer to the combustor section 104) than the temperature of the exhaust gas in the later stages (i.e., turbine stages closer to the exhaust gas outlet 122). Turbine stage S1 is the first stage and receives hot combustion gases from the combustor. Turbine stages in the turbine section 106 are successive (i.e., S1) such that combustion gas flows through the stages from S1 to a last stage Sn. Turbine stage S1 would encounter the highest temperature of exhaust gas than the subsequent stages Sn. Stage Sn may be stage two, stage three, stage four, or any other additional stages that may be applied in the turbine section 106.

A first exhaust gas path that extends through the turbine section 106 and the exhaust section 108 is defined by a turbine casing and an exhaust casing that seals each section respectively. The turbine casings is typically sealed except for an inlet that connects to the combustor section 104, and an outlet that connects to the exhaust section 108.

The original flow of exhaust gas through the first exhaust gas path is directed to and from the turbine section 106 to the exhaust section 108, and exits the gas turbine from the outlet 122 to an inline gas mixer 136 or a pipe that receives exhaust gas upstream of the heat recovery steam generator (HRSG) 140. Exhaust gas temperature may be monitored by a temperature monitor 138 that provides a reading of the temperature of exhaust gas prior to entering the heat recovery steam generator 140. Up to a predetermined limit of the exhaust gas produced by the gas turbine, between about 50% to 100%, in particular about 70% to 90%, may follow the first exhaust gas path.

If it is determined that exhaust gas is to be extracted from the stages, a second exhaust gas path may be used for the higher temperature extracted exhaust gas to flow to be mixed with the original flow of exhaust gas through the first exhaust gas path. The second exhaust gas path allows exhaust gas to be extracted from the turbine section through the turbine casing, and be extracted into pipes such as pipes 132 that are controlled by valves 130, which receives signals from a controller 200.

Depending on the desired increase in steam production, exhaust gas may be extracted out of the turbine casing to obtain a mixture of exhaust gas at a higher temperature.

The extracted exhaust gas from the second exhaust gas path is mixed with the flow of exhaust gas from the first exhaust gas path, such as being mixed in an inline mixer 136, in a pipe, or a duct, a combination thereof, or any other suitable mechanisms. As the mixed exhaust gas passes through the heat recovery steam generator 140, heat is extracted and steam is generated. Steam can be transported through pipes 144 directly to facilities 180 that distribute steam to users. Excess exhaust may be transported through pipes 146 to exhaust stack 190.

A controller 200 may be used to determine the desired steam production capacity, and send appropriate control signals to the control valves 130 at least of the turbine stages S1 to Sn. The controller 200 may be a microprocessor based processor that includes a nontransitory memory, and has the capability to calculate algorithms. The controller 200 determines a desired temperature of exhaust gas required to generate the desired amount of steam flow, and regulates valves 130 that extracts exhaust gas from the turbine section 106 to achieve the desired exhaust gas temperature.

The controller 200 may receive input data signals, such as steam flow data from flow monitor 148. Flow monitor 148 sends signals to the controller 200 that collects data and determines a desired amount of exhaust flow. The controller actuates the valves 130 to control exhaust gas extraction from the turbine stages, and to produce the desired temperature of mixed exhaust gas to flow to the heat recovery steam generator 140.

In an embodiment, steam may be redirected through pipes 142 to a steam turbine 150 to produce electricity prior to transporting steam through pipes 152 that may be in fluid communication with a distributor 170 which sends steam to users. Flow output from the steam turbine may also be monitored using a flow monitor 158 that sends data signals to the controller 200 to determine desired quantity of steam.

Data signals received by the controller 200, such as exhaust gas temperature and steam flow, may be analyzed to compare with a predetermined desired amount of steam flow. The controller 200 uses the received data signals to determine if hot exhaust gas would be desired to be extracted from the turbine stages and would select the appropriate valves 130 to extract the higher temperature exhaust gas from the turbine stages. Calculations include determining the quantity of steam needed and the amount of power desired, and determining the temperature and quantity of exhaust gas needed to produce the desired quantity of steam.

After determining the desired temperature and quantity of exhaust gas required for the heat recovery steam generator 140 to produce desired steam quantity, the controller 200 sends a signal to the receiver of the appropriate valve 130 to extract exhaust gas through the turbine casing.

Figure 2:
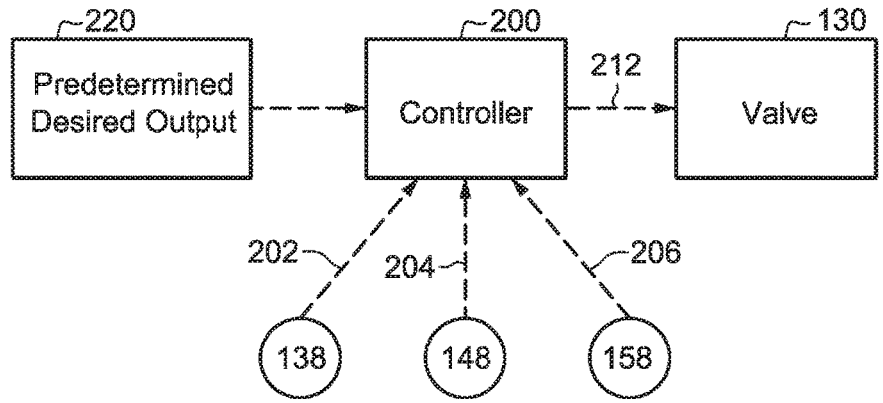
FIG. 2 is a diagram that illustrates input and output signals from the central controller.

As depicted in FIG. 2, a signal for predetermined desired output 220, such as output of the desired quantity of steam and desired amount of power, is sent to controller 200. Controller 200 also receives temperature readings 202 from temperature monitor 138, and flow readings 204, 206 from flow monitors 148 and 158. The controller 200 analyzes the readings 202, 204, 206 received from temperature monitor 138 and flow monitors 148, 158, calculates the desired amount and location to extract exhaust gas, and sends signals 212 to the appropriate valves 130 to extract the desired amount of exhaust gas.

In an embodiment, it may be desirable to extract exhaust gas from stage S1 that is closest to the combustor section 104 to obtain the highest temperature of exhaust gas possible to mix in with the original flow of exhaust gas through outlet 122. In another embodiment, it may be desirable to extract exhaust gas from stage S3 or other stages Sn to obtain only a slightly higher temperature than the original flow of exhaust gas through outlet 122.

The capacity of exhaust gas that may be extracted from the turbine section may be determined based upon the minimum operating capacity of the compressor section in the gas turbine. Compressor section in the gas turbine require a certain amount of exhaust gases in the turbine section in order to operate the rotating turbines that mechanically drives the compressors. The maximum amount of exhaust gas to be extracted is limited to the minimum amount of exhaust gases needed to operate the turbine section of the gas turbine. The capacity of exhaust gas that can be extracted from the turbine section is predetermined with limits set by the need to maintain compressor operation between safe operation limits.

Figure 3:
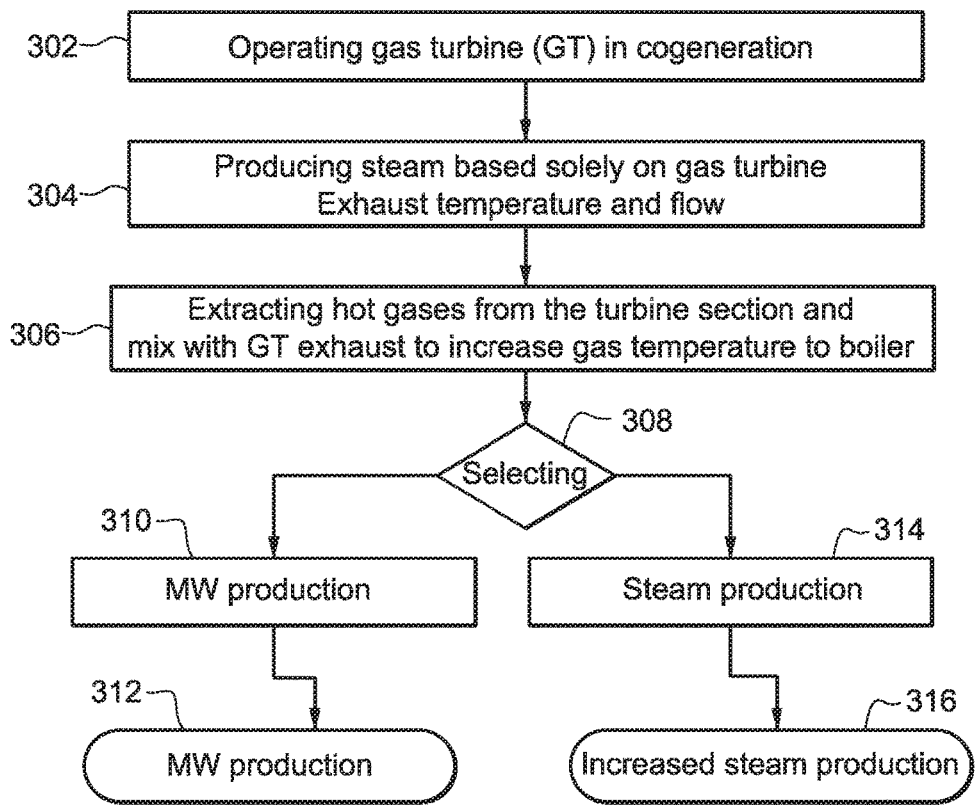
FIG. 3 is a flow chart of an embodiment cogeneration process that provides power and an increased production of steam.

A process of operating an embodiment cogeneration system is shown in FIG. 3. A gas turbine operating in cogeneration 302 may be connected to a steam production 304 that is based solely on gas turbine exhaust temperature and flow (304). Exhaust gases from the turbine section of the gas turbine may be extracted 306 to mix with the gas turbine exhaust to increase gas temperature that is sent to the boiler or the heat recovery steam generator to produce steam. Analysis and calculations may be made by a controller to select 308 a balance of power (MW) production 310 and steam production 312 to provide a steady power production 312 that is lower than the increased steam production 316. The increased steam production 316 is caused by the increased temperature of the mixed exhaust gas that is sent to the boiler or heat recovery steam generator.

Figure 4:
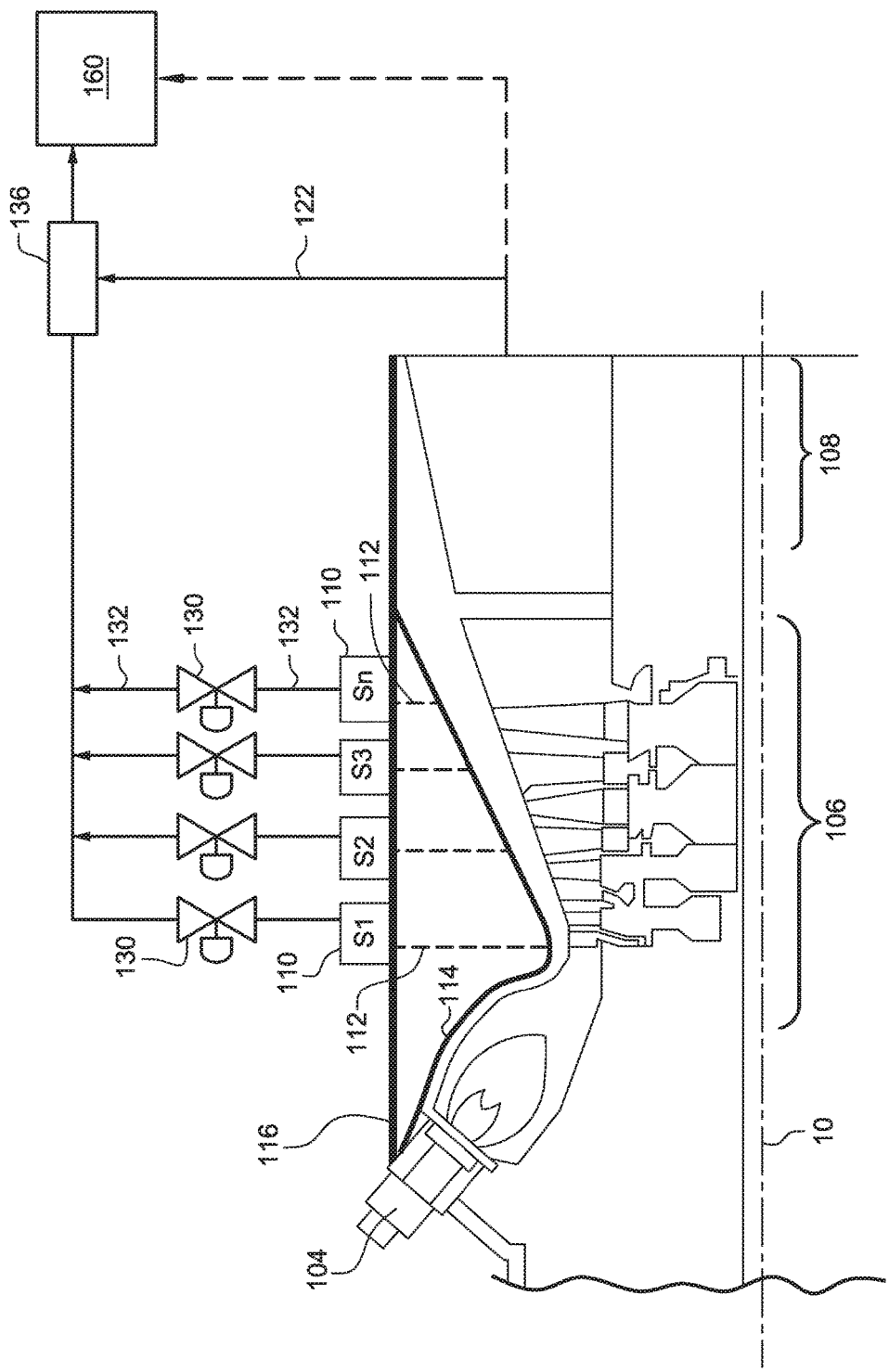
FIG. 4 is a schematic drawing of an embodiment turbine gas extraction assembly showing a portion of a turbine section and exhaust section that is above a rotational axis of the gas turbine.

An embodiment and method of extraction is schematically depicted in FIG. 4, showing an extraction assembly that is on an upper portion of a gas turbine that has a turbine section 106 and an exhaust section 108. The gas turbine has a rotational axis 10.

Exhaust gas may be extracted from each of the stages using an extraction pipe 112 that fluidly connects the turbine stages S1 to Sn to a duct 110 outside of the outer turbine casing 116. The extraction pipe 112 extends through a port in an inner turbine casing 114 and an outer turbine casing 116.

The volume of gas extraction from each of the turbine stages S1, S2, S3, to Sn in the turbine section 106 may be regulated by each of the corresponding valves 130 that connect to the extraction pipes 112 and ducts 110 at the turbine stages. The valves 130 each include a receiver that may receive control signals from a central controller to enable release and extraction of the exhaust gas from the desired stages. The extracted exhaust gas would be transported into an inline mixer 136 or a pipe to mix with the regular flow of exhaust gas that exits the gas turbine through the exhaust gas outlet 122.

The duct 110 may form a partial-rectangular or partial-circular shape around the turbine section 106. Extraction pipes 112 may be used to extract exhaust gas directly from the turbine stages, and transport the extracted exhaust gas into ducts 110. Ducts 110 may be connected to pipes 132 that include valves 130 to control gas extraction. There may be a plurality of extraction pipes 112 that are connected to one or more ducts 110 at each of the turbine stages. In another embodiment, there may be only one set of extraction pipes 112 that is connected to each of the turbine stages the turbine section. In a further embodiment, there may be only one set of extraction pipes 112 and duct 110 that is connected to an entire turbine section.

In another embodiment, tunnel type ducts and flanges could be used in place of pipes 112 and 110, such that flanges in the turbine casing may feed extracted exhaust gas into a tunnel type duct that is a rectangular shaped chamber, a communicating tunnel, a ring chamber, or any other suitable shaped duct that is placed on the turbine section. Exhaust gas extraction would be regulated by a valve that may be placed on subsequent pipes that connect to the original flow of exhaust gas that passes through the exhaust gas path. In a further embodiment, ducts 110 are pipes that are conventionally used in a gas turbine.

In yet another embodiment, extraction of exhaust gas may be performed in between two turbine stages.

Gas that has not been extracted by pipes 112 would exit the gas turbine through the normal flow of exhaust gas through the first exhaust gas path, via the exhaust gas outlet 122, to be transported to an inline mixer 136 or a pipe, and may be mixed with the extracted gases obtained from the second exhaust gas path.

In another embodiment, gas extracted from the turbine section may be transported directly to a working fluid device 160, such as a steam generator or boiler. The working fluid device 160 may only receive extracted exhaust gas from the second exhaust gas path, and may not receive gas from the first exhaust gas path.

Figure 5:
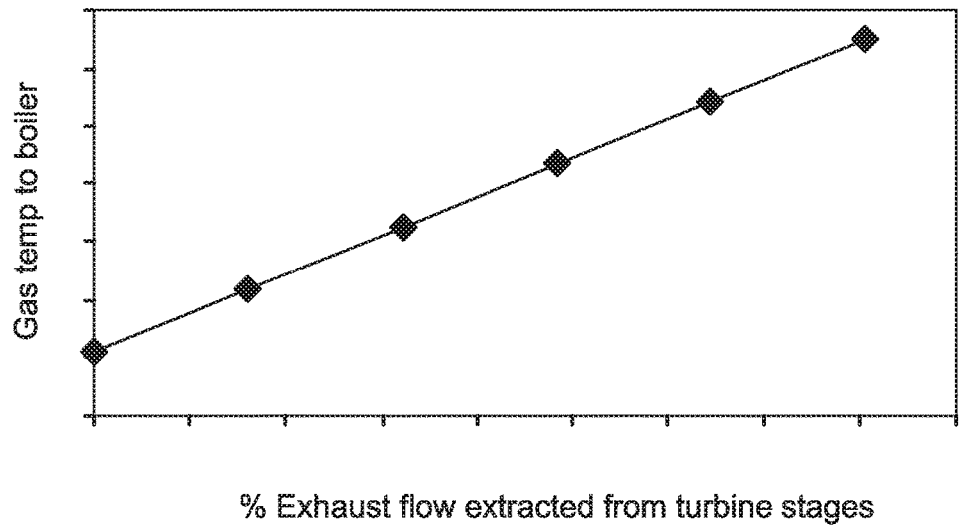
FIG. 5 is a graph of the temperature of the gas turbine exhaust gas flow to the boiler over percentage of extracted exhaust flow from the turbine.
Figure 6:
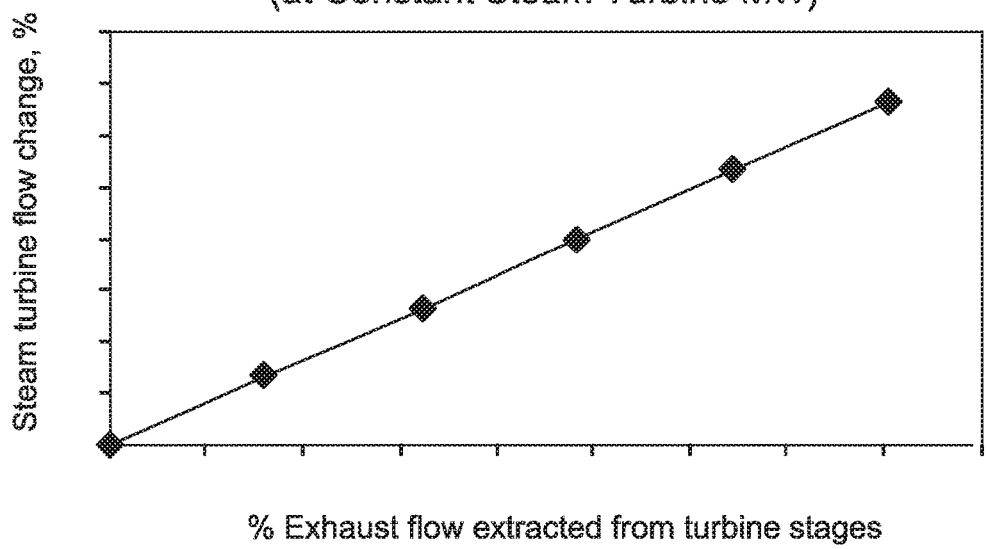
FIG. 6 is a graph of steam production increase over percentage of extracted exhaust flow from the turbine.

The effect of exhaust gas extraction is shown in FIGS. 5 and 6. FIG. 5 shows the effect of mixing extracted exhaust gas, which is at a higher temperature than the original exhaust flow, with the original exhaust gas flow. Temperature of the exhaust gas being directed to the boiler is shown to increase as percentages of exhaust flow extracted from the turbine stages increase.

Effect of steam production increase caused by extracting exhaust flow directly from turbine stages is shown in FIG. 6. Percentages of steam flow change are seen to increase as percentages of exhaust flow extracted from turbine stages increases. In other words, in an embodiment cogeneration system, steam production increases as more exhaust flow is directly extracted from the turbine stages and applied to a heat recovery generator. The ratio of increase in steam production may be more than a ratio of 1:1 of the percentages of exhaust flow extracted directly from the turbine stages.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine extraction assembly for a single-shaft gas turbine, comprising:
   the single-shaft gas turbine comprising a combustor in fluid communication with a turbine section;
   the single-shaft gas turbine including at least one turbine stage in the turbine section that is encased by a turbine casing, and an exhaust section connected to the turbine section having an exhaust outlet;
   at least one gas extraction mechanism placed at the turbine section that extracts exhaust gas from the at least one turbine stage through the turbine casing to produce extracted exhaust gas;
   a first exhaust gas path for a main exhaust gas; the first exhaust gas path is defined by the turbine casing of the turbine section; and extends from the turbine section through the exhaust section to the exhaust gas outlet to exit the single-shaft gas turbine; and
   a second exhaust gas path for the extracted exhaust gas that extends from the at least one turbine stage inside the turbine section, through the turbine casing via the at least one gas extraction mechanism, and towards an external environment outside the turbine casing, the second exhaust gas path bypasses the exhaust;
   at least one gas path junction located externally of the turbine casing;
   wherein the first exhaust gas path and the second exhaust gas path intersect at the at least one gas path junction, and the main exhaust gas and the extracted exhaust gas converge at the at least one gas path junction to produce a mixed exhaust gas;
   wherein the mixed exhaust gas is transported to a heat recovery steam generator separate from the turbine section and is applied as energy to produce work.

2. The assembly of claim 1, wherein a volume of the extracted exhaust gas is regulated by a valve that is operatively connected to the at least one gas extraction mechanism.

3. The assembly of claim 1, wherein the at least one gas extraction mechanism is a flange, a duct, a pipe, or a combination thereof.

4. The assembly of claim 1, wherein each of the at least one gas extraction mechanism is a set of one or more extraction pipes.

5. The assembly of claim 1, wherein each of the at least one gas extraction mechanism is placed directly at one of the at least one turbine stage.

6. The assembly of claim 1, wherein the at least one turbine stage of the turbine section includes 2 or more turbine stages: wherein the at least one gas extraction mechanism is placed in between two of the turbine stages.

7. A cogeneration system, comprising:
   a single-shaft gas turbine comprising a combustor in fluid communication with a turbine section;
   the single-shaft gas turbine including at least one turbine stage in the turbine section that is encased by a turbine casing, the turbine casing has a gas inlet at an upstream portion of the turbine section and an outlet at a downstream portion of the turbine section, and an exhaust section having an upstream portion that is connected to the outlet of the turbine section and a downstream portion that is connected to an exhaust gas outlet;
   at least one gas extraction mechanism placed at the turbine section that extracts exhaust gas from the at least one turbine stage through the turbine casing;
   a first exhaust gas path for a main exhaust gas defined by the turbine casing and the exhaust section; extending from the turbine section through the exhaust section to the exhaust gas outlet;
   a second exhaust gas path for an extracted exhaust gas that extends from the at least one turbine stage, through the turbine casing via the gas extraction mechanism, towards an external environment of the turbine casing, the second exhaust gas path bypasses the exhaust section;
   at least one gas path junction located externally of the turbine casing;
   wherein the first exhaust gas path and the second exhaust gas path intersect at the at least one gas path junction; and the main exhaust gas and the extracted exhaust gas converge at the at least one gas path junction to produce a mixed exhaust gas; and
   a heat recovery steam generator operatively connected downstream of the single-shaft gas turbine that receives the mixed exhaust gas from the at least one gas path junction and applies the energy from the mixed exhaust gas to generate steam.

8. The cogeneration system of claim 7, wherein the at least one turbine stage of the turbine section includes 2 to 4 or more turbine stages, the turbine stages are named from S1, S2, S3 to Sn.

9. The cogeneration system of claim 8, wherein the gas extraction mechanism is placed directly at or between the turbine stages in the turbine section.

10. The cogeneration system of claim 7, wherein the at least one gas extraction mechanism is regulated by a valve.

11. The cogeneration system of claim 7 further comprising a pipe connected to the at least one gas extraction mechanism that directs the extracted exhaust gas from the second exhaust gas path to converge with the main exhaust gas from the first exhaust gas path.

12. The cogeneration system of claim 7, wherein the at least one gas path junction is an inline gas mixer that is connected to the at least one gas extraction mechanism that directs the extracted exhaust gas from the second exhaust gas path to be mixed with the main exhaust gas from the first exhaust gas path.

13. The cogeneration system of claim 7, wherein the at least one gas extraction mechanism is a flange, a duct, a pipe, or a combination thereof.

14. A cogeneration system, comprising:
- a single-shaft gas turbine comprising a combustor in fluid communication with a turbine section;
- the single-shaft gas turbine having at least one turbine stage in the turbine section of the gas turbine that is enclosed inside a turbine casing, the at least one turbine stage is upstream of an exhaust section of the single-shaft gas turbine that is interconnected with the turbine section;
- at least one gas extraction mechanism that extends from the at least one turbine stage, through the turbine casing, to an external environment outside of the turbine casing;
- a main exhaust flow path that extends from the at least one turbine stage inside the turbine casing into the exhaust section, and exits the single-shaft gas turbine from an output of the exhaust section;
- an extracted exhaust flow path that extends from the at least one turbine stage inside the turbine casing and through the turbine casing via the at least one gas extraction mechanism to exit the single-shaft gas turbine, the extracted exhaust flow path bypasses the exhaust section; and
- a gas path junction located in the external environment outside of the turbine casing that joins the main exhaust flow path and the extracted exhaust flow path to form a mixed exhaust flow path, the gas path junction is directly connected to a heat recovery steam generator downstream from the single-shaft gas turbine;
- wherein the gas extraction mechanism is configured to extract exhaust gas directly from the at least one turbine stage and send extracted exhaust gas to the gas path junction;
- wherein the gas path junction is located immediately upstream of the heat recovery steam generator.

* * * * *